UNITED STATES PATENT OFFICE.

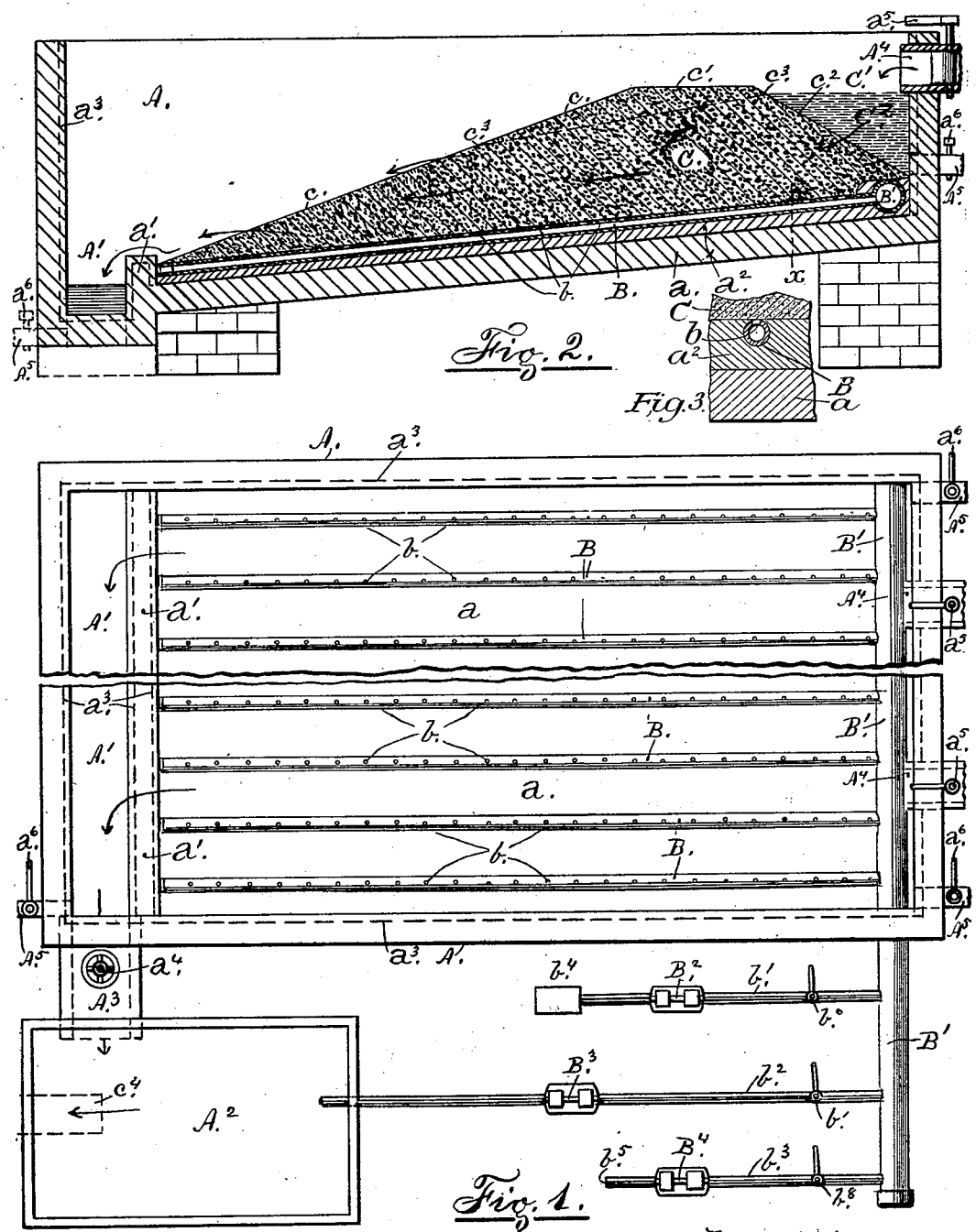

MILES L. DAVIS, OF LANCASTER, PENNSYLVANIA.

SYSTEM OF WATER FILTRATION AND PURIFICATION.

SPECIFICATION forming part of Letters Patent No. 677,641, dated July 2, 1901.

Application filed May 2, 1900. Serial No. 15,208. (No model.)

*To all whom it may concern:*

Be it known that I, MILES L. DAVIS, a citizen of the United States, residing at Lancaster, in the county of Lancaster and State of Pennsylvania, have invented certain new and useful Improvements in Systems of Water Filtration and Purification; and I do hereby declare the following to be a full, clear, and exact description of the invention, such as will enable others skilled in the art to which it appertains to make and use the same.

This invention relates to improvements in a system of water filtration and purification in which is arranged at any convenient point a prescribed tank having a sloping bottom supporting the filtering medium, through which impure water percolates by gravitation, and provided with means for washing or cleansing the same and with means for the injection of air and chemicals therethrough for its purification.

The object of the invention is to provide means whereby pure water may at all times and any weather conditions be inducted into reservoirs for the supply of cities or towns of any size.

The elements of the invention will severally and at large appear in the following description, and they will be separately and collectively pointed out in the claims.

The purposes of the invention are attained by the means and devices illustrated in the accompanying drawings, in which similar reference characters designates like parts throughout the several views, and in which—

Figure 1 represents in plan the end portions of the tank referred to in the opening paragraphs hereto, with the cleansing and purifying devices in place and with the filtering medium and the cement bottom covering omitted. Fig. 2 shows in elevation the upper portion of Fig. 1, a tube appearing in longitudinal vertical section through the line of perforations, with dots and broken lines indicating the filtering medium and unfiltered water in position; and Fig. 3, a sectional elevation of a portion, taken on the line $x$ in Fig. 2, somewhat enlarged.

In the drawings, A designates the tank, of prescribed dimensions and approved form; but in this instance it is shown to be rectangular in plan, having the required depth, with an inclined or sloping bottom $a$, having a sloping or inclined outlet chute or channel A' at the lower edge thereof and an upwardly-projecting bridge-wall $a'$ along said edge, separating said channel from said bottom. On top of this bottom, covering its entire surface, is a layer $a^2$ of cement, into which are embedded up to the lines of their top perforations a series of tubes or pipes, yet to be described, and the rest of the inner face of the tank, together with the bridge-wall and chute, may have a lining of cement, as is plainly indicated by dotted lines $a^3$. The chute A' is connected with a receiving well or reservoir $A^2$ by a conduit $A^3$ to induct filtered water into said reservoir, and the conduit is provided with a valve $a^4$ to regulate the flow of said filtered water or to completely close the same against the exit of any liquid or fluid matter therethrough when so desired. Near the upper edge, at the shallower end of the tank, are inlet ducts or tubes $A^4$ to induct unfiltered water thereinto, and the ducts are provided with valves $a^5$ to regulate or to completely cut off the flow of said water, while near its bottom, at its shallower and deeper ends, the tank is provided with outlet tubes or nozzles $A^5$ to conduct fluid matter therefrom, and these tubes or nozzles are provided with valves $a^6$, whereby they may be opened or closed at pleasure.

Embedded into the cement on the bottom is a series of tubes B, arranged in parallel rows a prescribed distance apart, extending from the upper to the lower end of the slope, with their plugged lower ends abutting against the bridge-wall and their upper ends secured, as by tapping, in the side of a feed-pipe B', arranged along the shallower end of the tank and extending a prescribed distance beyond a side thereof, while the upper face of the tubes is provided with punctures or orifices $b$ throughout their entire lengths, and into the outer portion of the pipe B' are tapped ends of tubes $b'$ $b^2$ $b^3$, connecting said pipe with pumps or injectors $B^2$ $B^3$ $B^4$, having tubular connection, respectively, with a chemical-receptacle $b^4$, the water-reservoir $A^2$, and atmospheric air, as at $b^5$. The tubes $b'$ $b^2$ $b^3$ are respectively provided with valves $b^6$ $b^7$ $b^8$, whereby the injection of chemicals, pure water, or atmospheric air may be regulated at pleasure.

On top of the bottom and completely covering the tubing B and the pipe B' within the tank is placed a filtering medium C, which may be sand, sand and gravel mixed, animal charcoal, or any other approved material, and this is arranged to the required depth, with a long sloping forward face $c$ extending to the bridge-wall and from which the filtered water emerges, a short horizontal upper face $c'$, which remains practically dry, and a short sloping rearward face $c^2$ extending to the line where the bottom meets the vertical wall at the shallower end of the tank and forming between said wall and sloping face a triangular space or channel C', receiving the water (indicated by the broken lines $C^2$) from the ducts $A^4$ before mentioned and from which it percolates by gravitation through the medium C to be filtered or purified, the dotted lines $c^3$ $c^3$ indicating a sloping plane above which said water will not rise in its passage through said medium and into the reservoir or well $A^2$ during filtration.

Now, the filtering plant as described having been erected near the source whence the supply of water is to be taken for the purpose, the operation of said plant or the process of filtering is as follows, to wit: The water being inducted by gravitation through the ducts $A^4$ into the channel C' and its flow regulated by means of the gates or valves $a^5$, said water $C^2$ from its own weight or by gravitation will pass or percolate (arrows indicating the course) through the mass of the filtering medium C, out through and down its long sloping face $c$, over the bridge-wall $a'$, into the chute A', and out through the conduit $A^3$, entering, practically clear or pure, the receiving reservoir or well $A^2$, from which, as at $c^4$, said water may be taken, by gravitation or force-pumps, into the storage or distributing reservoirs, which may be any distance away.

To cleanse or purify the filtering medium, the gates or valves $a^5$ and $a^4$ are closed, stopping the inflow of unfiltered water into the channel C' and its exit therefrom into the reservoir $A^2$, and the valves $a^6$ are opened to give egress through the tubes or nozzles $A^5$ to the washings from the tank. Opening then the valve $b^7$ and setting the pump or injector $B^3$ in motion will take filtered water from the reservoir $A^2$ and force it through the tubes $b^2$ B' B, in jets through the apertures $b$, up through the filtering medium, completely washing the same, the washings escaping through the nozzles $A^5$. Again, opening the valve $b^6$ and setting the pump or injector $B^2$ in motion, with chemicals in solution in a receptacle at $b^4$, will inject said chemicals through the tubes $b'$ B' B and apertures $b$, through the filtering medium, destroying germs or animalculæ adherent therein, and opening the valve $b^8$ and setting the pump or injector $B^4$ in motion will take atmospheric air at $b^5$ and inject it through the tubes $b^3$ B' B and apertures $b$ into and through the filtering medium, introducing oxygen thereinto, sweetening or purifying the same. These injectors or pumps may be operated one at a time, or the three may be set in motion working conjointly.

Having now described the invention and ascertained and shown the manner in which it is performed, what I consider new, and desire to secure by Letters Patent, is—

1. A system of water filtration and purification comprising: a tank having a sloping bottom, with an inclined outlet-chute at the lower edge of said bottom, and a bridge-wall along said edge separating said chute from said bottom, said chute adapted to convey filtered water to a receiving-well, and with means provided for the exit of washings at the lowest point of the tank; a series of parallel tubes, with apertures through their upper faces, arranged on top of said bottom and extending from the lower to the upper edge thereof, and a feed-pipe arranged along said upper edge with one end projecting beyond a side of the tank, said parallel tubes having their plugged lower ends abutting against the bridge-wall and their upper ends secured into the side of said feed-pipe, with a layer of cement embedding the parallel tubes to their upper face-apertures, and overlying the feed-pipe; a filtering medium arranged in trapezium form above said tubes and feed-pipe, entirely covering the sloping bottom, with a long sloping lower face extending to the bridge-wall, a short horizontal top face, and a short sloping upper face extending to the side wall at the shallower end of the tank, forming with said wall a channel or recess for the reception of water to be filtered, with means provided for the induction of water thereinto, and for the eduction of washings therefrom; and with means provided, such as force-pumps or injectors, for the injection of filtered water, chemicals, and air, separately or simultaneously; all substantially as described and for the purpose hereinbefore set forth.

2. In a system of water filtration and purification having a tank with an inclined bottom and an inclined chute at the lower edge thereof with a bridge-wall along said edge parting said chute and bottom, a series of tubes arranged on said bottom and extending from the lower to the upper edge thereof, with a feed-pipe arranged along said upper edge and projecting beyond a side of the tank, said tubes having their lower ends against said bridge-wall and their upper ends tapped into said feed-pipe with a line of apertures in each one in their upper faces, a layer of cement covering said feed-pipe and embedding said tubes up to said lines of apertures, with a filtering mass arranged on said layer of cement as shown, with means provided for the induction of unfiltered water into the tank above said filtering mass and the eduction of filtered water from its lower end, with injectors connected with the feed-pipe for cleansing and purifying the filtering mass, and
5 with means provided for the exit of washings from the tank, all substantially as described and for the purpose hereinbefore set forth.

In testimony whereof I affix my signature in presence of two witnesses.

MILES L. DAVIS.

Witnesses:
PAUL A. HERR,
FRED. P. MENTZER.